UNITED STATES PATENT OFFICE.

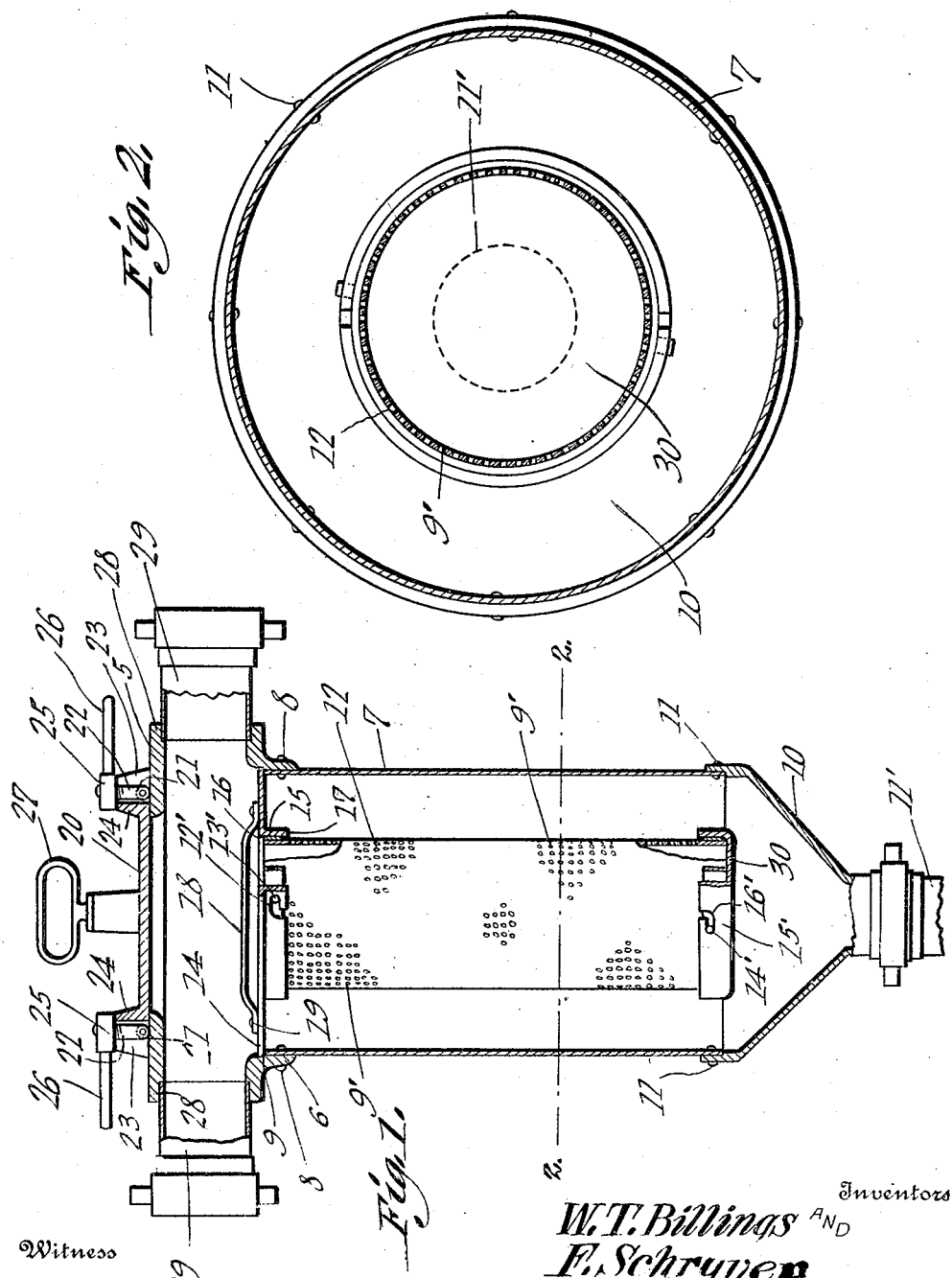

WILLIAM T. BILLINGS AND FREMONT SCHRYVER, OF ITHACA, NEW YORK.

MILK-STRAINER.

1,348,536.  Specification of Letters Patent.  Patented Aug. 3, 1920.

Application filed January 19, 1920. Serial No. 352,402.

*To all whom it may concern:*

Be it known that we, WILLIAM T. BILLINGS and FREMONT SCHRYVER, citizens of the United States, residing at Ithaca, in the county of Tompkins, State of New York, have invented a new and useful Milk-Strainer, of which the following is a specification.

This invention relates to new and useful improvements in filtering or straining devices, and more particularly to devices especially constructed for straining milk in the production of condensed milk.

The primary object of the invention is to provide a device of this character capable of application to a pipe line between the supply and discharge ends thereof, thus insuring the straining of the fluid passing through the supply pipe.

A further object of the invention is to provide a straining device including a removable straining element which may be readily and easily removed for cleaning purposes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 illustrates a longitudinal sectional view through a straining device constructed in accordance with the present invention, and Fig. 2 illustrates a transverse sectional view taken on line 2—2 of Fig. 1.

Referring to the drawing in detail, the reference character 5 designates the head of the straining device, the same being preferably circular in plan, the lower side thereof being provided with a downwardly extending annular flange 6 for the purpose of supporting the body portion 7 of the strainer proper.

This strainer body 7 includes a relatively long tubular section having its upper end fitted within the head, the upper end engaging the annular flange 6, and having connection therewith through the medium of the rivets 8 passing through suitable openings in the flange and the upper end of the body 7.

An annular shoulder 9 is also provided within the head 5, and adjacent the upper end of the body 7, for purposes to be hereinafter more fully described, it being understood that this shoulder lies in a plane equal to the plane of the upper surface of the upper edge of the body 7.

The lower end of the body 7 extends into the upper end of the funnel shaped member 10, and has connection therewith through the medium of the bolts 11, whereby movement of the funnel shaped member 10 is absolutely prevented, the lower end of the funnel shaped member 10 having connection with the discharge pipe 11'; for conveying or directing the fluid passing through the straining body, to any suitable tank or device associated with the filtering mechanism forming the present invention.

Supported within the body 7 of the strainer, is a removable filtering member 12 which includes a tubular member of a length equal to the length of the body 7, the tubular member being supported in spaced relation with the body 7 to provide a passageway between the filtering member 12 and the inner walls of the body 7 of the straining device.

This straining device 12 is formed preferably of metal and is provided with a plurality of relatively small straining openings 9' formed in the walls thereof, which openings provide communication between the interior of the straining member and the body member 7, so that the material passing through the straining member may pass through the openings 9", and into the funnel shaped member where the same may be carried off by means of the discharge pipe 11'.

A circular metallic plate 14 is provided with a central opening 16, the walls of which extend downwardly as at 16 to provide an annular flange 17 for accommodating the upper end of the straining member 12, said flange having a slot 12' adapted to receive the pin 13' formed on the upper end of the straining member 12, whereby the straining member 12 is removably supported within the body 7 of the straining device, portions of the circular plate having engagement with the shoulder 9 to prevent movement of the straining member 12 with relation to the body 7 thereof.

From the foregoing it is obvious that portions of the circular plate 14 surrounding the central opening 15 provide means for closing the upper end of the annular passageway between the straining member 12 and the body portion 7.

Pins 14' are also provided on opposite sides of the straining member 12 adjacent the lower end thereof, which pins operate in the slots 16' formed in the upwardly extending flange 15' formed on the removable bottom member 30. From the foregoing it is obvious that the straining member 12 may be readily removed and cleaned.

In order to facilitate the removal of the inner straining member 12, a handle 18 is provided which has its ends secured to the circular plate 14 by means of the rivets 19.

The upper portion of the body 5, is open to permit easy access to the interior of the filtering body 7, there being a removable cover 20 employed in connection with the body 5 for closing the opening to prevent the fluid passing into the body 7 of the filtering device from splashing or finding its way from the body 5, and at the same time this cover 20 prevents foreign matter from entering the body 5.

Arms 21 extend outwardly from the side walls of the opening formed in the upper portion of the body 5, and have pivotal connection with the upwardly extending arms 22, which operate to move within the slotted portions 23, formed in the periphery of the cover 20 at points diametrically opposite each other, the slots 23 being substantially housed by the upwardly extending lugs 24, formed integral with the cover 20.

As shown, the upper end of each of the pivoted arms 22, is threaded to receive the head 25 of the operating levers 26. It is therefore obvious that when the cover 20 is positioned over the opening in the body 5, the arms 22 are moved to positions as indicated by Fig. 1 of the drawing, whereupon the operating levers are rotated to cause the heads 25 thereof to contact with the lugs 24, whereupon the cover is secured to the body 5 against displacement, and if it becomes necessary to remove the cover 20 in order that the filtering member 12 may be removed for cleaning purposes, it is only necessary to operate the levers 26 in the opposite direction to permit the arms 22 thereof to swing downwardly and out of contact with the walls of the slots 23, it follows that the cover 20 may now be lifted from the body 5 by grasping the handle 27.

Relatively short pipes 28 extend from opposite sides of the body 5, and provide means for receiving the ends of the supply pipes 29, which have connection with a suitable reservoir, or supply tank, not shown.

In the operation of the device, fluid is fed to the pipes 29, whereupon the fluid is discharged into the body 5, the same passing downwardly through the filtering device 12, and due to the closure 30, closing the lower end of the filtering device 12, the fluid which enters the filtering device 12, is forced laterally through the openings 9' formed in the side walls of the straining member 12. The fluid is now freed of all foreign substances, and the strained fluid is directed to suitable tanks or vats where the same may be carried off at the will of the operator.

Having thus described the invention, what we claim as new is:—

1. In a straining device, a head, a body portion depending from the head and having a funnel-shaped member connected to the lower end thereof, an annular shoulder formed at the upper end of the body portion, a straining device comprising a relatively long tubular member having laterally extending pins secured adjacent to the upper end thereof, a circular plate resting on the shoulder and having a depending flange, said flange having slots formed therein, said slots adapted to receive the pins of the straining member for removably securing the straining member to the circular plate, and a removable bottom supported on the lower end of the straining member.

2. In a straining device, a head, a cylindrical body portion secured to the head and in communication therewith, a funnel-shaped discharge member secured to the lower end of the body portion, a removable straining member including a circular plate supported adjacent the upper end of the body portion, a tubular perforated member removably secured to the circular plate, the walls of the tubular member being disposed in spaced relation with the inner walls of the body portion, laterally extending pins formed at the base of the tubular perforated member, a bottom member having upwardly extending flanges, said flanges being provided with slots adapted to receive the pins, for removably securing the bottom member to the tubular member, and means having connection with the circular plate for removing the straining member.

In testimony that we claim the foregoing as our own we have hereto affixed our signatures in the presence of two witnesses.

WILLIAM T. BILLINGS.
FREMONT SCHRYVER.

Witnesses:
  E. I. BUTTON.
  WM. H. MORRISON.